Feb. 2, 1932. R. LEE 1,843,426
VARIABLE SPEED TRANSMISSION
Filed Aug. 7, 1929
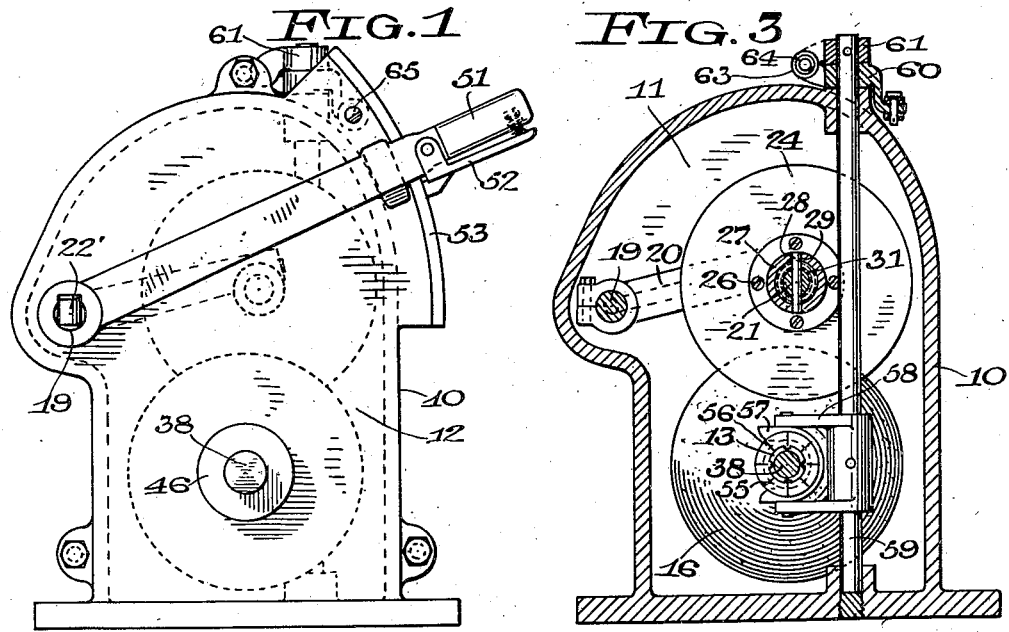
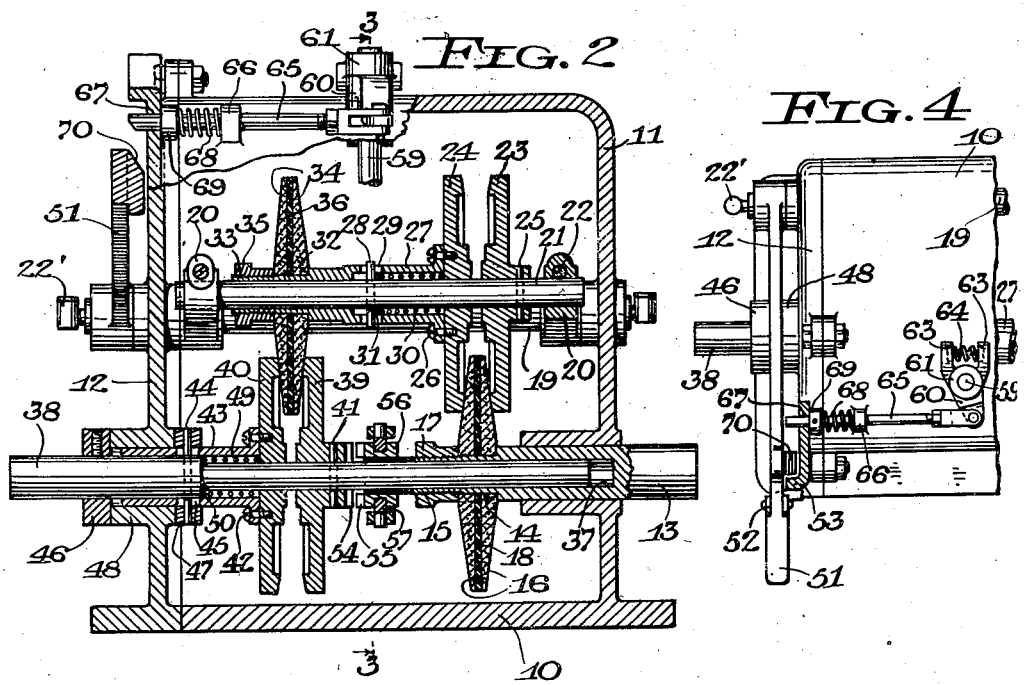
INVENTOR
Royal Lee
ATTORNEY Patented Feb. 2, 1932

1,843,426

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

VARIABLE SPEED TRANSMISSION

Application filed August 7, 1929. Serial No. 384,088.

The invention relates to variable-speed transmissions of the friction drive type.

Variable-speed transmissions have heretofore been devised in which a friction disk is adjustably projected between a pair of spaced coaxial friction wheels urged against the opposite faces of the disk to secure frictional engagement between the disk and wheels.

The general object of the invention is to improve upon this type of friction drive for the purposes of increasing the efficiency of the drive, securing quiet operation and minimizing local wear on the friction disk.

A more specific object is to provide a rotary friction member which consists of a pair of friction disks having yielding non-metallic material interposed therebetween.

Another object of the invention is to provide a variable-speed transmission in which the driving and driven shafts are arranged coaxially.

A further object of the invention is to provide a transmission which includes a countershaft arranged in parallel relation to the coaxial driving and driven shafts and carrying a plurality of rotary friction elements thereon adjustably engaging rotary friction elements carried on the driving and driven shafts.

A further object is to provide a simple but effective means for adjusting the speed ratio of the transmission.

A further object is to provide a clutch between the driving and driven members for securing a direct drive at unity speed ratio.

A further object is to effect automatic engagement of the clutch when a speed ratio of unity is reached.

A further object of the invention is to perfect details of construction generally.

The invention further consists in the several features hereinafter set forth and more particularly defined by the annexed claims.

In the accompanying drawings, Fig. 1 is an end elevation of a variable-speed transmission embodying the invention;

Fig. 2 is a longitudinal sectional elevation of the transmission;

Fig. 3 is a transverse sectional elevation taken on the line 3—3 of Fig. 2, and

Fig. 4 is a fragmentary top plan view of the transmission, parts being broken away and parts being shown in section.

In these drawings, the numeral 10 designates a casing having opposite end walls 11 and 12, the latter of which is separably secured to the casing. A driving shaft 13 is journalled in the end wall 11 and is provided with a reduced end within the casing which forms a shoulder 14, the reduced end portion of the shaft having an exterior thread 15. A pair of friction disks 16 are mounted on the reduced end of the driving shaft 13 and are secured thereon between the shoulder 14 and a clamping nut 17 which is threaded onto the shaft. A disk of resilient material 18, such as rubber, is interposed between the two friction disks 16 and may be cemented thereto. The friction disks 16 converge outwardly and are formed of suitable material such as fibre, bakelite or impregnated fabric.

A rock shaft 19 extends longitudinally within the casing and is journalled in the opposite end walls 11 and 12. A pair of rocker arms 20 are fixedly secured to the rock shaft 19 and are disposed near the opposite end walls of the casing. A countershaft 21 is journalled between the outer end portions of the arms 20 and may be lubricated in any suitable manner as by wicking 22 passing through the arms and into the rock shaft.

A pair of friction wheels 23 and 24 are carried on the countershaft 21 in axially spaced relation, the friction wheel 23 being fixedly secured to the counter-shaft as by means of a pin 25, and the friction wheel 24 being secured, as by means of screws 26, to the flanged end of a bushing 27 which is longitudinally slidable on the countershaft but is secured against relative rotation thereon by means of a pin 28 passing through slots 29 in the bushing. The portion of the bushing 27 adjacent the friction wheel 24 is enlarged to form a tubular space about the countershaft receiving therein a compressed coiled spring 30 which at one end bears against the friction wheel and at the other end bears against a washer 31 in engagement with the pin 28, thus urging the friction wheel 24 relatively toward the friction wheel 23. The friction wheels 23 and 24 receive between them the connected friction disks 16, the friction faces of the friction wheels being relatively narrow and being sloping to fit the friction disks. When the countershaft 21 is moved toward the driving shaft 13, as hereinafter described, the friction wheels 23 and 24 are urged apart to engage wider portions of the friction disk 16 at a region closer to the axis of the driving shaft 13, and when the countershaft is moved away from the driving shaft, the friction wheels 23 and 24 are urged closer to each other. However, the approaching movement of the friction wheels is limited in any suitable manner as by means of the engagement of their hub portions in order that driving engagement between the friction wheels and friction disks may be released before the wheels and disks are radially separated and in order to maintain a distance between the driving faces of the friction wheels which will permit the friction wheels to be subsequently engaged with the friction disks.

The end portion of the bushing 27 remote from the friction wheel 24 is reduced to form a shoulder 32 and the reduced end portion of the bushing is provided with a thread 33. A pair of friction disks 34 are mounted on the reduced end of the bushing and are secured thereon between the shoulder 32 and a clamping nut 35 threaded onto the bushing. A disk of resilient non-metallic material 36, such as rubber, is interposed between the friction disks 34 and may be cemented thereto. The disks 34 are similar to the disks 16 and the disk or sheet 36 is similar to the disk or sheet 18.

The driving shaft 13 is provided with a concentric bore 37 in which is journalled a reduced end of a driven shaft 38, the shaft 38 passing through the end wall 12 of the casing. A pair of friction wheels 39 and 40 are mounted on the driven shaft 38. The friction wheel 39 is fixedly secured to the shaft 38, as by means of a pin 41 passing through the shaft, and the friction wheel 40 is secured as by means of screws 42 to the flanged end of a bushing 43 which is longitudinally movable on the enlarged portion of the shaft 38, but is held against rotation thereon by means of a pin 44 passing through slots 45 formed in the bushing. The bushing 43 is journalled in the end wall 12 of the casing and thus supports the shaft 38. In the present instance, the driven shaft is held against axial displacement by stop collars 46 and 47 secured thereon and engageable with opposite end faces of a bearing boss 48 in which the bushing 43 is journalled. The friction wheels 39 and 40 are axially spaced on the shaft 38 and are urged relatively together by a compressed coiled spring 49 surrounding the reduced portion of the shaft 38 within the bushing 43 and bearing at one end on the friction wheel 40 and at the other end against a shoulder 50 formed on the shaft. The spaced friction wheels 39 and 40 receive between them the friction disks 34 mounted on the countershaft, the frictional engagement between the friction wheels and friction disks being maintained by the coiled spring 49. The friction wheels 39 and 40 are limited in their approaching travel by the engagement of their hub portions to effect the release of their driving engagement with the friction disks 34 when the latter are moved outwardly therefrom and to permit the subsequent engagement of the friction disks with the friction wheels.

An operating lever 51 is secured to one end of the rock shaft 19 for varying the position of the countershaft 21 with respect to the axis of the driving and driven shafts and is provided with a releasable spring-urged latch 52 which is engageable with a quadrant 53 carried on the end wall 12 of the casing. The opposite ends of the rock shaft 19 may be provided with oil cups 22" for facilitating the lubrication of the rock shaft and countershaft.

In some instances, it is desirable to secure a direct drive between the driving and driven shafts, when a speed ratio of unity is attained, to thereby reduce wear on the friction disks and friction wheels. When the clutch is to be used, the driving ratio of the disks is made equal to unity at a point when the friction disks 34 are near their outermost position with respect to the driving wheels 39 and 40, and, at such time, the effective driving radii of the friction disks 16 and 34 and the friction wheels 23, 24, 39 and 40 are all equal. Any suitable type of clutch, either mechanical or magnetic, may be used to connect the driving and driven shafts, but, in the present instance, a jaw clutch is illustrated which is preferably though not necessarily provided with ratchet teeth. The hub of the friction wheel 39 is utilized as one of the clutch members and is provided with clutch teeth 54 to cooperate with clutch teeth 55 formed on a clutch member 56, the clutch member being splined on the reduced end of the driving shaft 13. The clutch member 56 is peripherally grooved to receive a U-shaped clutch collar 57 which is trunnioned on a yoke 58 secured to a vertically-extending clutch or rock shaft 59 journalled in the upper and lower parts of the casing. The upper end of the shaft 59 projects through the casing and has a lever 60 journalled thereon and a collar 61 secured thereto, there being spring seats 63 formed on the lever 60 and collar 61 to receive anchored ends of a coiled spring 64 which forms a yielding connection between the lever and the collar. A rod 65 is pivotally connected to the lever 60 and is guided for longitudinal movement by slidably passing through a lug 66 attached to the casing and by passing through an opening 67 formed in the end wall 12 of the casing. The rod 65 is surrounded by a compressed coiled spring 68 which is interposed between the lug 66 and a collar 69 secured to the rod to urge the rod outwardly to the position seen in Figs. 2 and 4, in which position the collar 69 is in engagement with a side of the quadrant 53 and the the clutch is released. The outer end of the rod 65 is bevelled to engage a cam face 70 formed on the operating lever 51 to effect the displacement of the rod to clutch-engaging position when the operating lever is swung upwardly from the position seen in Fig. 1. This displacement of the rod 65 takes place at a point when the driving ratio of the transmission is substantially unity.

In operation, a suitable source of power is connected to the driving shaft 13 to rotate the friction disks 16. The friction disks 16 transmit power to the friction wheels 23 and 24, carried on the countershaft 21, the speed of the countershaft being capable of adjustment by moving the hand lever 51 to vary the position of the countershaft with respect to the driving shaft 13. Power is then transmitted from the friction disks 34, carried on the countershaft, to the friction wheels 39 and 40 which are secured to the driven shaft 38, and power is transmitted from the driven shaft 38 to any suitable device connected therewith. When the countershaft 21 is closest to the driving shaft 13, the driven shaft 38 rotates at its lowest speed, and when the countershaft is near its highest position, the driven shaft 38 rotates at its highest speed which, in the present instance, is equal to the speed of the driving shaft. When the operating lever 51 is moved upwardly to obtain the speed ratio of unity, it displaces the rod 65 by its cam engagement therewith and rocks the clutch shaft 59 to effect the engagement of the clutch including the clutch member 56, thus connecting the driving and driven shafts directly together. If the teeth of the clutch members do not happen to be in register at the moment the clutch is to be engaged, the spring 64 at the upper end of the clutch shaft is temporarily compressed until the clutch teeth engage. A further upward movement of the operating lever 51 serves to release the friction disks from their co-operating friction wheels, thus insuring against any transmission of power through these disks and wheels when the clutch is engaged. If the speed of the driven shaft is again to be reduced, the operating lever 51 is moved downwardly which effects the engagement of the friction disks and wheels and effects the release of the clutch, the clutch-operating rod 65 being urged outwardly by its spring 68 to thereby rock the clutch shaft and release the clutch.

To avoid excessive end play of the driving shaft, countershaft and driven shaft, it is desirable to secure one of these shafts against axial movement and in the present instance, the driven shaft 38 is secured against such movement. The countershaft and driving shaft are nevertheless held against excessive axial movement by the driving connections between these shafts and the driven shaft. Also the driving connections are of such character as to avoid the existence of any appreciable end thrust on the shafts. The transmission of power from the driving shaft to the countershaft and from the countershaft to the driven shaft takes place from the friction disks to the friction wheels, so that if any slippage or stalling should occur there will be no flat spots worn on the friction disks, which are of softer material than the friction wheels, and any wear which might take place under this condition would be distributed around the disks, and thereby would not result in a subsequent loss of driving efficiency or in noisy operation. The use of the resilient sheets of rubber between the friction disks is of importance in securing good driving efficiency notwithstanding slight irregularities in the disks or in the wheels and is also important in obtaining quiet operation.

While the transmission as shown in the drawings is capable of a relatively wide speed range, it will be obvious that it is possible to greatly increase the speed range by connecting two such transmissions in tandem, the driven shaft of one transmission being connected to the driving shaft of the other transmission, and the two transmissions being either arranged in separate casings or in a common casing. With such arrangement the rock shafts 19 for the countershaft may or may not be connected for simultaneous movement.

The resilient sheets 18 and 36 may be conveniently formed of sponge rubber in order to permit the rubber to flow when placed under compression. As another expedient, the sheets may be formed of solid rubber, which is perforated or recessed to form voids. In some instances, imperforate sheets of rubber may be used and the inner faces of the friction disks may be recessed to permit the flow of the rubber.

What I claim as new and desire to secure by Letters Patent is:

1. In a variable-speed transmission, the combination of coaxially arranged driving and driven shafts, rotary friction elements mounted on said shafts, a countershaft arranged in spaced parallel relation to the axis of said driving and driven shafts and being movable relatively thereto, rotary friction elements carried on said countershaft and engageable with the friction elements on said driving and driven shafts for effecting the transmission of power between said driving and driven shafts at a variable-speed ratio, and a clutch for directly connecting said driving and driven shafts at a speed ratio of unity.

2. In a variable-speed transmission, the combination of coaxially arranged driving and driven shafts, rotary friction elements mounted on said shafts, a countershaft arranged in spaced parallel relation to the axis of said driving and driven shafts and being movable relatively thereto, rotary friction elements carried on said countershaft and engageable with the friction elements on said driving and driven shafts for effecting the transmission of power between said driving and driven shafts at a variable-speed ratio, a clutch for directly connecting said driving and driven shafts at a speed ratio of unity, means for relatively displacing said countershaft with respect to the axis of said driving and driven shafts, and means co-operating with said last-named means for engaging said clutch when a speed ratio of substantially unity is attained.

3. In a variable-speed transmission, the combination of a support, coaxially arranged driving and driven shafts rotatably mounted in said support, rotary friction elements carried by said driving and driven shafts, a rock shaft journalled in said support, arms carried by said rock shaft against relative rotation, a countershaft journalled in said arms and having its axis spaced from and parallel to the axis of said driving and driven shafts, rotary friction elements carried on said countershaft and engageable with the rotary friction elements on said driving shaft and driven shaft for transmitting power between said driving shaft and driven shaft, a lever connected to said rock shaft for displacing said countershaft toward and away from the axis of said driving and driven shafts to vary the speed ratio of the transmission, a clutch for directly connecting said driving and driven shafts, and clutch operating means having a connection with said lever for effecting the engagement of said clutch when a speed ratio of substantially unity is attained.

4. In a variable-speed transmission, the combination of coaxially arranged driving and driven shafts, a rotary disk-like friction member mounted on said driving shaft, a pair of friction wheels mounted on said driven shaft, a countershaft arranged in spaced parallel relation to said driving and driven shafts and movable relatively thereto, a pair of friction wheels carried on said counter-shaft and having said disk-like friction member projected therebetween in driving engagement therewith, a second disk-like friction member mounted on said countershaft in driving engagement with the friction wheels thereon, and projecting between the friction wheels on said driven shaft in driving engagement with said wheels, said disk-like friction members being of softer material than said friction wheels and the transmission of power from said driving shaft to said countershaft and from said countershaft to said driven shaft taking place in each instance from a disk-like friction member to a pair of friction wheels, whereby to avoid localized wear on said disk-like friction members upon the occurrence of slipping or stalling.

5. In a variable-speed transmission, the combination of a pair of coaxially mounted friction wheels normally urged toward each other, a pair of coaxial friction disks arranged on an axis spaced from and parallel to the axis of said friction wheels and being interposed between said friction wheels and respectively engageable therewith, and a sheet of resilient rubber interposed between said friction disks and having voids formed therein.

6. A friction element for variable speed transmissions, comprising a shaft, a pair of adjacent coaxial friction disks carried on said shaft and having friction surfaces at their outer sides, and a sheet of resilient rubber interposed between said friction disks and having voids formed therein.

In testimony whereof, I affix my signature.

ROYAL LEE.